(12) United States Patent
Zheng et al.

(10) Patent No.: US 9,323,080 B2
(45) Date of Patent: Apr. 26, 2016

(54) DISPLAY PANEL AND MANUFACTURING METHOD, PANEL DISPLAY DEVICE THEREOF

(75) Inventors: Hua Zheng, Guandong (CN); Shyh-Feng Chen, Guandong (CN); Pei Lin, Guangong (CN); Mingwen Lin, Guandong (CN); Liangdong Wu, Guandong (CN); Pan Gao, Guandong (CN); Shangpan Chen, Guandong (CN); Long Pan, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 13/643,089

(22) PCT Filed: Sep. 13, 2012

(86) PCT No.: PCT/CN2012/081342
§ 371 (c)(1),
(2), (4) Date: Oct. 24, 2012

(87) PCT Pub. No.: WO2014/036749
PCT Pub. Date: Mar. 13, 2014

(65) Prior Publication Data
US 2014/0072729 A1    Mar. 13, 2014

(51) Int. Cl.
*C09K 19/00* (2006.01)
*G02F 1/1333* (2006.01)

(52) U.S. Cl.
CPC .. *G02F 1/1333* (2013.01); *G02F 2001/133388* (2013.01); *Y10T 29/49* (2015.01); *Y10T 428/10* (2015.01)

(58) Field of Classification Search
CPC . G02F 1/134309; G02F 1/1343; G02F 1/136; G02F 1/134336; G02F 2001/133388; G02F 2001/136295; G02F 1/1333; G02F 1/133328; Y10T 29/49; Y10T 428/10
USPC ............... 428/1.1; 29/292, 292.1, 592, 592.1; 349/139, 142, 151, 152, 187; 445/24
See application file for complete search history.

(56) References Cited

U.S. PATENT DOCUMENTS

2008/0123040 A1*    5/2008    Yang et al. .................... 349/151

* cited by examiner

*Primary Examiner* — Ruiyun Zhang
(74) *Attorney, Agent, or Firm* — Andrew C. Cheng

(57) ABSTRACT

The present invention provides a display panel, which includes active area and vacant area surrounding the active area, and dummy pattern area without display functionality being disposed along boundary between active area and vacant area. The present invention also provides a manufacturing method of display panel and a panel display device. The present invention disposes dummy pattern area along boundary active area to withstand loading effect and to ensure active area is not affected by loading effect and display patterns are normal and uniform.

6 Claims, 2 Drawing Sheets

DISPLAY PANEL AND MANUFACTURING METHOD, PANEL DISPLAY DEVICE THEREOF

The present application claims priority of "DISPLAY PANEL AND MANUFACTURING METHOD, PANEL DISPLAY DEVICE THEREOF", application number 201210331726.4 submitted to China Patent Bureau on date Sep. 10, 2012.

BACKGROUND OF THE INVENTION

1. Field of the Invention

The present invention relates to the field of image displaying techniques, and in particular to a panel display and manufacturing method thereof, panel display device.

2. The Related Arts

Optical etching process is important to the manufacturing of panel display device. The main steps comprise: thin film deposition→photo-resist coating→exposure→photo-resist lithography→thin film etching→photo-resist removal. Under normal circumstances, photo-resist lithography uses liquid lithography solution, and the thin film etching of metal (alloy) layer uses liquid etching solution for etching. Both are so called wet processes. In wet process, the thin film pattern on substrate will affect the partial density of the ingredient in the solution. That is, if the area of the photo-resist or the area of the metal (alloy) requires lithography is large, more ingredient will be consumed; on the other hand, if the area of the photo-resist or the area of the metal (alloy) requires lithography is small, less ingredient will be consumed.

Solution has a diffusion effect to maintain the same density everywhere in the solution. When differences exist in the thin film patterns on the substrate, the ingredient in the solution will diffuse from high density place to lower density place during the lithography or etching process, which leads to different lithography or etching result for boundary area of the pattern and the center area of the pattern. This effect is referred to as loading effect.

The following takes photo-resist lithography process of pixel electrode layer of liquid crystal panel as example to explain the bad influence of loading effect on active area (AA) of liquid crystal panel.

FIG. 1 shows a design of pixel electrode layer of a known liquid crystal panel. The center of the panel is active area 1, which has small photo-resist area requiring lithography. The majority outside of active area 1 is vacant area 2, which has large photo-resist area requiring lithography. By enlarging the view of the boundary area A' of active area 1 in FIG. 1, the inner side design is normal pixel area 3, with tidy ITO electrode array, and the outer side design is vacant area (without ITO electrode array) 4. Because of loading effect, the actual photo-resist lithography process is different from the idealistic design. The actual result is shown in FIG. 2. Similarly, By enlarging the view of the boundary area A' of active area 1 in FIG. 2, boundary area 5 near vacant area 4 will show pattern irregularity because of insufficient photo-resist lithography. The pixel irregularity becomes less towards the inner side, and the idealistic design appears at pixel area 3 that is in sufficiently inner side. The specific process of loading effect on photo-resist lithography is as follows: at the beginning of the lithography process, active area 1 slowly consumes a small amount of lithography ingredient and vacant area 2 rapidly consumes a large amount of lithography ingredient. The density different leads to lithography ingredient in active area 1 diffusing towards vacant area 2. From the perspective of boundary area A' of active area 1, lithography solution density at boundary area 5 shows obvious gradient decreasing; that is, the closer to vacant area, the lower the density of lithography solution. In subsequent lithography process, lithography capability in boundary area 5 decreases in gradient manner, and the photo-resist lithography result is less for pixels closer to vacant area 4. Loading effect lessens the photo-resist lithography result of boundary area 5, which leads to pattern irregularity of etching process (mainly, unable to etch pattern or coarse etched pattern).

The pattern irregularity in boundary area 5 will cause defective image display. Not only the luminance, view angle and response time are different from those of normal pixel area 3, but also influences the charging and discharging characteristics of normal pixel area 3. Hence, it is desirable to eliminate pattern irregularity.

SUMMARY OF THE INVENTION

The technical issue to be addressed by the present invention is to provide a display panel, manufacturing method and panel display device thereof, able to maintain normal and uniform patterns in active area.

The present invention provides a display panel, which comprises active area and vacant area surrounding the active area, and dummy pattern area without display functionality being disposed along boundary between active area and vacant area.

According to a preferred embodiment of the present invention, in a wet process of the display panel, a first solution concentration at an intersection area of the dummy pattern area and the active area is substantially equal to a second solution concentration at the active area, and a third solution concentration at the dummy pattern area gradually decreases from the intersection towards the vacant area to form pattern irregularity in the dummy pixel area 1.

According to a preferred embodiment of the present invention, solution concentration at active area stays unchanged.

According to a preferred embodiment of the present invention, the active area, vacant area and dummy pattern area are disposed on pattern layers of the display panel for lithography or etching in wet process, and the pattern layers comprise: pixel electrode layer, first metal layer and second metal layer.

According to a preferred embodiment of the present invention, the active area, vacant area and dummy pattern area are disposed on the pixel electrode layer and the dummy pattern area comprises a plurality of dummy pixels.

The present invention provides a manufacturing method of display panel, which comprises the steps of: disposing active area and vacant area surrounding the active area; and disposing dummy pattern area without display functionality along boundary between active area and vacant area.

According to a preferred embodiment of the present invention, the dummy pattern area satisfies the following conditions: in a wet process of the display panel, a first solution concentration at an intersection area of the dummy pattern area and the active area is substantially equal to a second solution concentration at the active area, and a third solution concentration at the dummy pattern area gradually decreases from the intersection towards the vacant area to form pattern irregularity in the dummy pixel area 1.

According to a preferred embodiment of the present invention, the active area, vacant area and dummy pattern area are disposed on pattern layers of the display panel for lithography or etching in wet process, and the pattern layers comprise: pixel electrode layer, first metal layer and second metal layer.

According to a preferred embodiment of the present invention, the active area, vacant area and dummy pattern area are disposed on the pixel electrode layer and the dummy pattern area comprises a plurality of dummy pixels.

The present invention provides a panel display device, which comprises a display panel, the display panel further comprising: active area and vacant area surrounding the active area, and dummy pattern area without display functionality being disposed along boundary between active area and vacant area.

According to a preferred embodiment of the present invention, in a wet process of the display panel, a first solution concentration at an intersection area of the dummy pattern area and the active area is substantially equal to a second solution concentration at the active area, and a third solution concentration at the dummy pattern area gradually decreases from the intersection towards the vacant area to form pattern irregularity in the dummy pixel area 1.

According to a preferred embodiment of the present invention, solution density at active area stays unchanged.

According to a preferred embodiment of the present invention, the active area, vacant area and dummy pattern area are disposed on pattern layers of the display panel for lithography or etching in wet process, and the pattern layers comprise: pixel electrode layer, first metal layer and second metal layer.

According to a preferred embodiment of the present invention, the active area, vacant area and dummy pattern area are disposed on the pixel electrode layer and the dummy pattern area comprises a plurality of dummy pixels.

The efficacy of the present invention is that to be distinguished from the state of the art. Because the display panel, manufacturing method and panel display device provided by the present invention dispose dummy pattern area along boundary of active area to withstand loading effect, the present invention ensures active area free from loading effect and the patterns are normal and uniform.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

The following description refers to drawings and preferred embodiments of the present invention.

An embodiment of the present invention provides a display panel, which comprises an active area and a vacant area surrounding the active area, and a dummy pattern area without display functionality being along the boundary between the active area and the vacant area.

The present invention is applicable to pattern layers using a wet process for lithography or etching, such as, a pixel electrode layer, a first metal layer or a second metal layer. For convenience of description, the following uses the pixel electrode layer as example for description.

Figure 3:
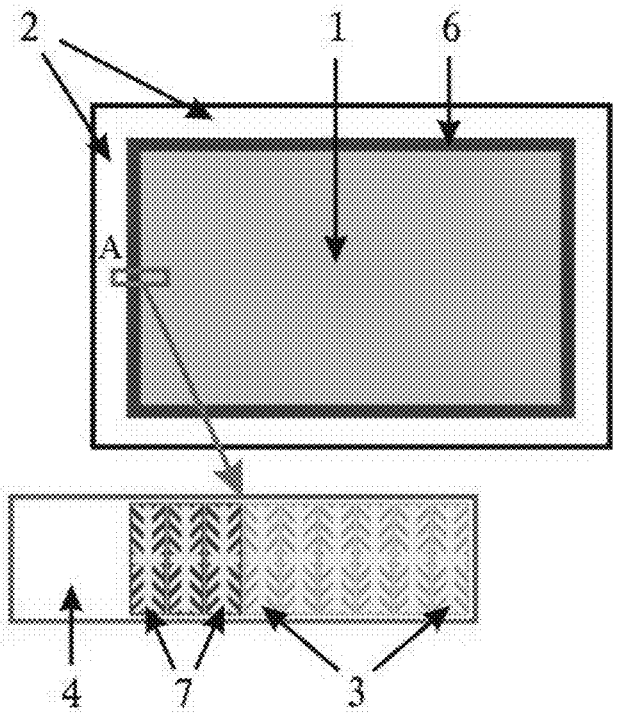
FIG. 3 is a schematic view showing the design of a display panel according to the present invention.
Figure 4:
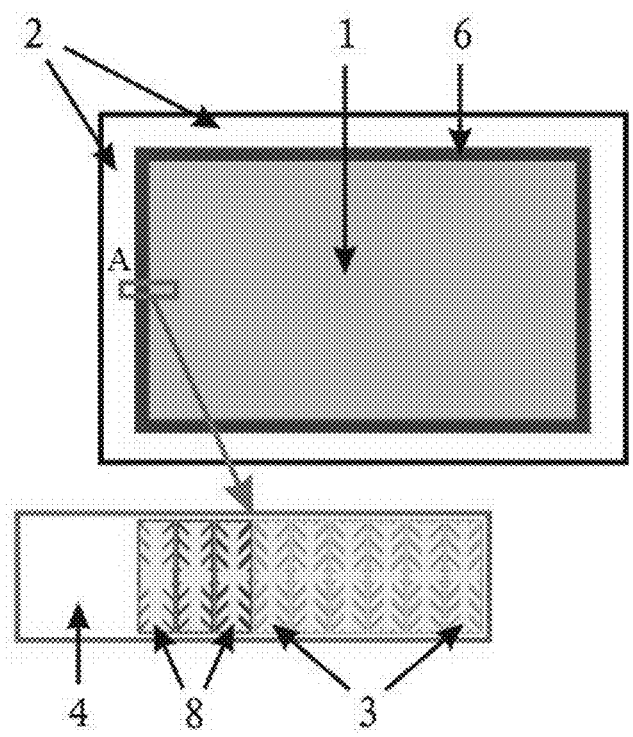
FIG. 4 is a schematic view showing the actual result of the design of a display panel according to the present invention.

Specifically, referring to FIGS. 3-4, FIG. 3 is a schematic view showing the design of a display panel according to the present invention; and FIG. 4 is a schematic view showing the actual result of the design of a display panel according to the present invention.

As shown in FIG. 3, a display panel of the embodiment of the present invention comprises an active area (AA) 1 and a vacant area 2 surrounding the active area 1, and a dummy pattern area 6 without display functionality being disposed along boundary of active area 1 between the active area 1 and the vacant area 2. From an enlarged view of the boundary area A of active area 1 in FIG. 3, the dummy pattern area 6 comprises a plurality of dummy pixels 7. The pattern design of the dummy pixel 7 can be identical to the pixel of the normal pixel area 3, or can be adjusted depending on application. Dummy pixel 7 has not electrical or optical functionality and is not connected to drive signal; therefore, the dummy pixel 7 will neither affect the charging and discharging of the normal pixel area 3, nor increase the load of driver circuit.

The following uses lithography process as example to explain how the display panel of the present invention achieve normal display pattern without the loading effect.

Figure 1:
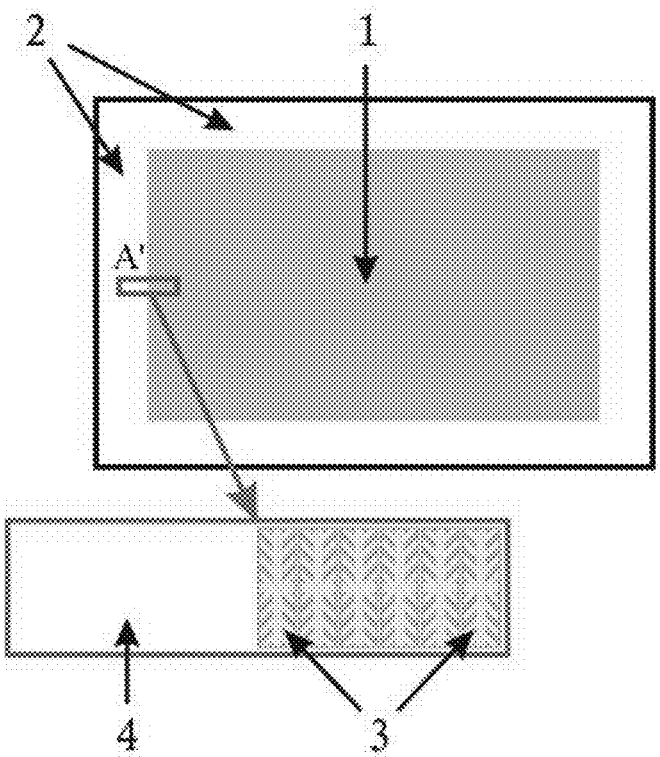
FIG. 1 is a schematic view showing the design of a known display panel.

At the beginning of lithography process, the active area 1 slowly consumes a small amount of lithography ingredient, and the vacant area 2 rapidly consumes a large amount of lithography ingredient. The density difference drives the lithography ingredient to diffuse from the active area 1 toward the vacant area 2. In contrast to known design in FIG. 1, the display panel of the present invention disposes a dummy pattern area 6 on the boundary of the active area 1. Under the influence of loading effect, lithography solution density at the dummy pattern area 6 shows obvious gradient decreasing outwards (that is, from the normal pixel area 3 towards the vacant area 4). The area closer to the vacant area 4 is, the lower the lithography solution density is. In other words, a first solution concentration at an intersection area of the dummy pattern area 6 and the active area 1 is substantially equal to a second solution concentration at the active area 1, and a third solution concentration at the dummy pattern area 6 gradually decreases from the intersection area towards the vacant area 2 to form pattern irregularity in the dummy pixel area 6.

Figure 2:
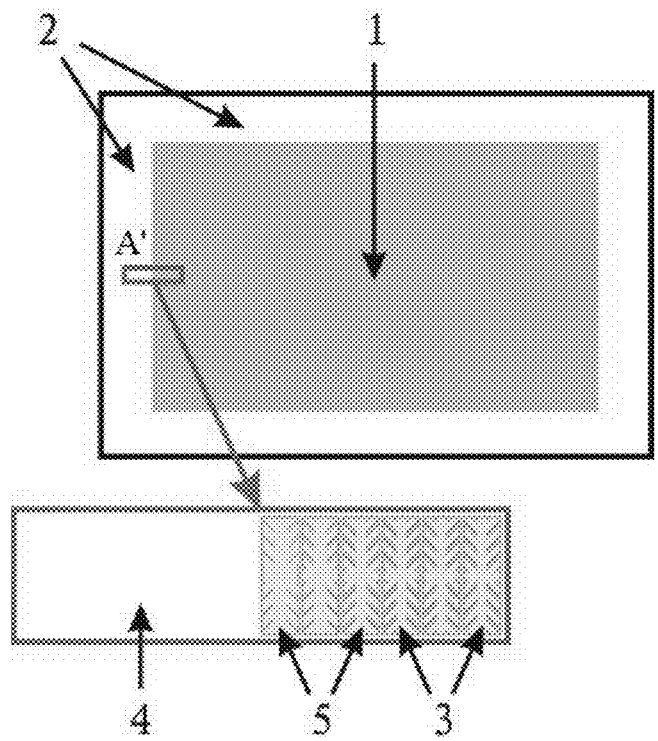
FIG. 2 is a schematic view showing the actual result of the design of a known display panel.

In subsequent lithography process, lithography capability in dummy pattern area 6 decreases in gradient manner, and the photo-resist lithography result is less for pixels closer to vacant area 4. The actual result is as shown in FIG. 4. From an enlarged view of boundary area A of active area 1 in FIG. 4, the pattern of the dummy pixel 8 near the vacant area 4 is affected by the loading effect to form an irregular pattern, so that the entire normal pixel area 3 away from the vacant area 4 stays normal and uniform, in contrast with FIG. 2 showing a irregular boundary area 5.

The efficacy of the embodiment of the present invention is that to be distinguished from the state of the art. Because all the pixels in the active area in known technique are for displaying image, the boundary pixels are easily affected by loading effect during the wet process. The present embodiment of the present invention disposes the dummy pattern area 6 in place of the boundary area 5 to withstand loading effect. With the dummy pattern area 6 as buffer, the normal pixel area 3 is away from the vacant area 4 and not affected by loading effect. All the patterns in the normal pixel area 3 are normal and uniform to ensure the patterns at each layer in the active area 1 are the same as the design. On the other hand, because the dummy pattern area 6 does not function for displaying, the displaying function of the display panel will not be affected even when the dummy pattern area 6 is affected by the loading effect.

The size of the dummy pattern area 6 and required number and pattern of the dummy pixels can be determined by experiments. The only condition that must be met is: a first solution concentration at an intersection area of the dummy pattern area and the active area is substantially equal to a second solution concentration at the active area, and a third solution concentration at the dummy pattern area gradually decreases from the intersection area towards the vacant area to form pattern irregularity in the dummy pixel area 6.

Correspondingly, the second embodiment of the present invention provides a manufacturing method of display panel, comprising the steps of: disposing the active area and the vacant area surrounding the active area; and disposing the dummy pattern area without display functionality along the boundary between the active area and the vacant area.

According to a preferred embodiment of the present invention, the dummy pattern area satisfies the following conditions: in a wet process of the display panel, a first solution concentration at an intersection area of the dummy pattern area and the active area is substantially equal to a second solution concentration at the active area, and a third solution concentration at the dummy pattern area gradually decreases from the intersection area towards the vacant area to form pattern irregularity in the dummy pixel area 6.

The active area, the vacant area and the dummy pattern area are disposed on pattern layers of the display panel for lithography or etching in the wet process, and the pattern layers comprise: a pixel electrode layer, a first metal layer and a second metal layer.

As a preferred embodiment, the active area, the vacant area and the dummy pattern area are disposed on the pixel electrode layer and the dummy pattern area comprises a plurality of dummy pixels.

After disposing the active area and the vacant area like a known technique, the instant embodiment further disposes the dummy pattern area without display functionality along boundary between the active area and the vacant area. The present invention uses the dummy pattern area 6 to withstand loading effect, and ensure the active area 1 free from loading effect. All the patterns in the normal pixel area 3 are normal and uniform. Because the dummy pattern area 6 does not function for displaying, the displaying function of the display panel will not be affected even when the dummy pattern area 6 is affected by loading effect.

The display panel in the first embodiment of the present invention can be applied to liquid crystal display (LCD), plasma display panel (PDP) organic LED (OLED), and so on. Hence, the third embodiment of the present invention provides a panel display device, comprising a display panel disclosed in the first embodiment of the present invention. The efficacy of the instant embodiment is based on the first embodiment, and the description is omitted.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A display panel, comprising an active area and a vacant area surrounding the active area, and a dummy pattern area without display functionality being along boundary between the active area and the vacant area;
   the active area, the vacant area and the dummy pattern area are disposed on pattern layers of the display panel for lithography or etching in a wet process, and the pattern layers comprise: a pixel electrode layer, a first metal layer and a second metal layer;
   the active area and the dummy pattern area are disposed on the pixel electrode layer and the dummy pattern area comprises a plurality of dummy pixels;
   the active area comprises a plurality of pixels having normal pattern design, and pattern design of the dummy pixels is identical to the normal pattern design of the pixels, and pattern of the dummy pixels near the vacant area is an irregular pattern;
   wherein the irregular pattern is generated from solution concentrations being existing at an intersection area of the dummy pattern area and the active area, at the active area, and at the dummy pattern area, and the solution concentration at the dummy patter area gradually decreases from the intersection area towards the vacant area during the wet process.

2. The display panel as claimed in claim 1, characterized in that the solution-concentration at the active area stays unchanged.

3. A panel display device, which comprises a display panel, the display panel comprising: an active area and a vacant area surrounding the active area, and a dummy pattern area without display functionality being along boundary between the active area and the vacant area;
   the active area, the vacant area and the dummy pattern area are disposed on pattern layers of the display panel for lithography or etching in a wet process, and the pattern layers comprise: a pixel electrode layer, a first metal layer and a second metal layer;
   the active area, the vacant area and the dummy pattern area are disposed on the pixel electrode layer and the dummy pattern area comprises a plurality of dummy pixels;
   the active area comprises a plurality of pixels having normal pattern design, and pattern design of the dummy pixels is identical to the normal pattern design of the pixels, and pattern of the dummy pixels near the vacant area is an irregular pattern;
   wherein the irregular pattern is generated from solution concentrations being existing at an intersection area of the dummy pattern area and the active area, at the active area, and at the dummy pattern area, and the solution concentration at the dummy patter area gradually decreases from the intersection area towards the vacant area during the wet process.

4. The panel display device as claimed in claim 3, characterized in that solution concentration at the active area stays unchanged.

5. The display panel as claimed in claim 1, characterized in that a first solution concentration at an intersection area of the dummy pattern area and the active area is equal to a second solution concentration at the active area, and a third solution concentration at the dummy pattern area gradually decreases from the intersection towards the vacant area to form the irregular pattern at the dummy pixel area.

6. The panel display device as claimed in claim 3, characterized in that a first solution concentration at an intersection area of the dummy pattern area and the active area is equal to a second solution concentration at the active area, and a third solution concentration at the dummy pattern area gradually decreases from the intersection towards the vacant area to form the irregular pattern at the dummy pixel area.

* * * * *